Patented July 24, 1934

1,967,862

UNITED STATES PATENT OFFICE 1,967,862

CYCLIC COMPOUND AND PROCESS FOR PREPARING SAME

Wallace H. Carothers, Fairville, Pa., and Arnold M. Collins, Wilmington, Del., assignors to E. I. du Pont de Nemours & Company, Wilmington, Del., a corporation of Delaware No Drawing. Application November 2, 1931, Serial No. 572,724

39 Claims. (Cl. 260—57)

This invention pertains to certain new cyclic compounds and methods of preparing them. More particularly it relates to cyclic compounds obtained by causing beta-substituted alpha, gamma dienes of the general formula

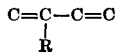

in which R is a negative atom or group, to react with compounds containing an activated carbon-carbon double bond. As examples of such beta-substituted dienes we may mention chloro-2-butadiene-1,3; bromo-2-butadiene-1,3; phenyl-2-butadiene-1,3; methyl-2-chloro-3-butadiene-1,3; methyl-2-chloro-3-pentadiene-2,4; methyl-3-chloro-4-hexadiene-3,5; etc. In these compounds the chlorine or bromine atom or the phenyl group may be regarded as functioning as a negative group. Examples of compounds containing an activated double bond are alpha, beta-unsaturated acids and their esters and anhydrides such as maleic acid, maleic anhydride, diethyl maleate, fumaric acid, ethyl fumarate, acrylic acid, itaconic anhydride, and citraconic anhydride; alpha, beta-unsaturated aldehydes and ketones such as acrolein, and methyl vinyl ketone; and quinones such as benzoquinone, toluquinone, and naphthoquinone.

Alpha, gamma dienes substituted in the B-position have not hitherto been available. Practical methods for the preparation of several of these compounds have been described in a copending application of Carothers and Collins, Serial No. 490,538, filed October 22, 1930. In this application, there is described the preparation of chloro-2-butadiene-1,3 and bromo-2-butadiene-1,3 by the reaction between hydrogen chloride or hydrogen bromide and monovinylacetylene, the reaction in a preferred form being carried out by passing monovinylacetylene into an aqueous solution of a hydrogen halide, the solution also containing a cuprous halide (e. g., cuprous chloride) and an ammonium salt (e. g., ammonium chloride), these two last-named compounds functioning as catalysts for the reaction. A copending application of Carothers and Coffman, Serial No. 569,832, filed October 19, 1931, describes the preparation of substituted butadienes containing a halogen (e. g., chlorine) in the 2-position, and also containing an organic radical (e. g., alkyl and aryl radicals) in the 3- and/or 4-position, by condensing acetylene with aldehyde or ketone containing at least two carbon atoms, dehydrating the resulting carbinol, and reacting the resulting substituted vinylacetylene with a hydrogen halide (e. g., hydrogen chloride) preferably in aqueous solution and in the presence of a catalyst similar to that described in the Carothers and Collins case, above cited. A copending application to Jacobson, Serial No. 569,833, filed October 19, 1931, describes the preparation of substituted butadienes containing a halogen (e. g., chlorine) in the 2-position, and also containing an organic radical (e. g., alkyl and aryl radicals) in the 1-position by reacting monovinylacetylene with sodamide, then reacting the sodium vinylacetylide with an alkyl chloride, sulfate or sulfonate and further reacting the substituted vinylacetylene so formed with a hydrogen halide (e. g., hydrogen chloride) preferably in aqueous solution and in the presence of a catalyst similar to that described in the Carothers and Collins case, cited above. A copending application of Carothers, Serial No. 583,391, filed December 26, 1931, describes the preparation of butadiene-1,3 substituted in the β-position by negative radicals other than halogen, e. g., phenyl-2-butadiene-1,3, by reacting a halogen-4-butadiene-1,2, e. g., chloro-4-butadiene-1,2 (which is formed simultaneously with chloro-2-butadiene-1,3 under the method described in the Carothers and Collins application, cited above when no catalyst or a weak catalyst is used) with a Grignard reagent, MgXCl in which X is a negative organic radical, e. g., phenyl.

Prior art

Disclosures concerning the direct addition of alpha, gamma dienes to compounds containing an active carbon-carbon double bond of the type C=C—C=O are found in various papers. W. Albrecht in 1906 (Ann. 384, 31 (1906)) pointed out that cyclopentadiene reacts readily with benzoquinone to form a stable addition product. H. V. Euler and K. O. Josephson later (Ber. 53, 822 (1920)) described an addition product of isoprene and benzoquinone to which they assigned the formula:

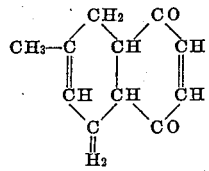

More recently Diels and Alder (Ann. 460, 98 (1928); 470, 62 (1929); 478, 137 (1930); Ber. 62, 554, 2081-2087, 2337 (1929)), have extended this reaction to include a variety of open chain and cyclic 1,3-dienes on the one hand and a variety of compounds containing the system C=C—C=O on the other hand. Following this work a series of patents has been applied for or issued (I. G., British Pat., 324,661 (September 1928); 300,130 (November 1928); 325,669 (January 1929); German Pat., 502,043 (July 6, 1928); 500,160 (August 24, 1928); German appl. J. 35,778 IV/12-o October 1928; J. 36,757, IV/12-o (October 1928); J. 36,757, IV/12-o (January 1929), D. 56,867, IV/12-o; Naef & Co., French Pat. 672,025 (March 1929)), covering the addition of 1, 3-dienes to various compounds containing active carbon-carbon double bonds. The dienes to which explicit disclosures have been made are butadiene, isoprene, beta, gamma-dimethylbutadiene, alpha-phenylbutadiene, dihydrobenzene, cyclopentadiene, furane, pyrrole, etc.

Description of the invention

The present invention is concerned with the application of this reaction to 1,3-dienes that is, alpha, gamma dienes, having a negative substituent in the beta-position. The products of this reaction contain the carbon skeleton:

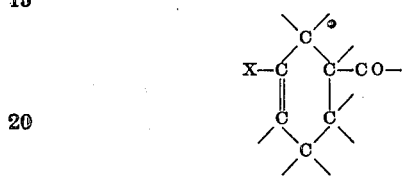

and may be considered to be cyclohexene derivatives carrying a negative substituent on one of the doubly bonded carbon atoms. Compared with the 1,3-dienes previously known, these new dienes having a negative beta-substituent show an extraordinary tendency to react with themselves with the formation of various types of polymers. But we have found that it is possible nevertheless to bring about combination between the new dienes and compounds containing activated carbon-carbon double bonds and at the same time to avoid any serious losses owing to the polymerization of the diene. In some cases this combination is so rapid compared with the polymerization that no special precautions are required to avoid losses due to polymerization. In other cases where the desired combination is slower it has been found that losses through polymerization can be cut down to a negligible extent by the addition of a polymerization inhibitor such as pyrogallol, catechol, etc.

One object of the invention comprises a new process for preparing cyclic compounds by the reaction between substituted alpha, gamma butadienes containing a negative substituent in the B-position. A more specific object relates to the same general process in which a halogen-2-butadiene-1,3 is used as a reactant. A further object relates to new compounds produced by these processes. Other objects of the invention will appear from the description of the invention given below.

To carry out the process of the present invention we mix a diene of the class already named with a reactant (e. g., a compound of the classes named in paragraph 1, page 1, containing a reactive double bond) and cause them to react. In certain cases reaction occurs spontaneously with the liberation of heat; in other cases it is necessary to supply heat to the reaction mixture. In many cases it is advantageous to carry out the reaction in the presence of a solvent such as benzene or alcohol, especially since the solvent usually diminishes the tendency of the diene to react with itself at the expense of the desired reaction. The tendency of the diene to polymerize is further diminished by the presence of polymerization inhibitors. Most compounds classified as antioxidants are capable of fulfilling this function. Examples of compounds that are especially effective in this respect are polyhydric phenols such as catechol, hydroquinone, pyrogallol; amines such as tetraphenyl hydrazine, toluylene diamine, thiodiphenyl amine, phenyl-beta-naphthylamine, and nitro compounds such as trinitrobenzene. The reaction having been completed, the product is isolated by some method consistent with its properties, e. g., by crystallization or distillation. The products of this invention are for the most part new compounds. They are useful as intermediates in the synthesis of perfumes, medicinals, and dyes. They readily undergo further transformations to yield valuable compounds, as will be illustrated below.

A Manufacture of derivatives of naphthalene

We have found that negatively beta-substituted alpha, gamma-dienes react readily with benzoquinone and its homologs. The simplest representative of the new class of compounds probably has the constitution:

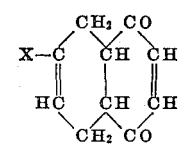

in which X is a negative atom or group. Compounds of this class are slightly colored crystalline solids. On standing, or heating especially in contact with water, they are converted into isomeric colorless crystalline compounds having the probable formula:

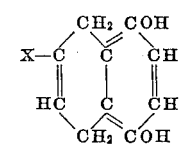

These by the action of mild oxidizing agents such as ferric chloride are dehydrogenated (with the intermediate formation of quinhydrone-like compounds) to substituted dihydronaphthoquinones of the formula:

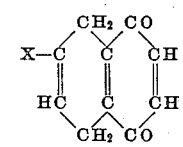

Stronger oxidizing agents such as chromic acid then lead to further dehydrogenation with the production of beta-substituted naphthoquinones having the formula:

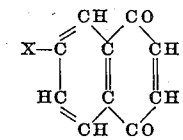

These last by the further action of stronger oxidizing agents such as boiling nitric acid are converted into 4-substituted phthalic acids having the formula:

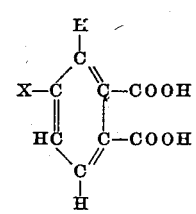

The process of the present invention thus provides a general method for the preparation of alpha-naphthoquinones containing a negative substituent in position 6. In carrying out the process of the present invention it is desirable to bring about the combination of the substituted diene with the benzoquinone under mild conditions and to avoid the use of a large excess of the diene, since otherwise there is a tendency to produce considerable amounts of anthraquinone derivatives. The process is illustrated by the following examples

Example I

*Chloro-6-tetrahydro-1,4,4a,8a-naphthoquinone*

Seventeen and seven-tenths parts of chloro-2-butadiene-1,3, 21.6 parts of benzoquinone and 20 parts of benzene are heated under reflux for 3 hours. On cooling, radiating masses of yellow crystals and compact masses of black crystals separate. This mixture is recrystallized from ligroin, and washed with slightly warm ligroin to remove most of the dark material. A second crystallization from ligroin gives faintly yellow-green crystals melting at 101°–104° C.

Example II

*Chloro-6-dihydro-5,8-dihydroxy-1,4-naphthalene*

The greenish yellow crystals of Example I when heated above 105° C. resolidify and then melt at about 180° C. on further heating. This change in melting point is due to the isomerization of the chloro-6-tetrahydro-4a,5,8,8a-naphthoquinone into the phenolic form chloro-6-dihydro-5,8,dihydroxy-1,4-naphthalene. The same transformation can be brought about more smoothly and completely by heating the yellow crystals with water. Thus 5 parts of the product of Example I are heated with 200 parts of boiling water for 10 minutes. On cooling, slender white needles separate from the solution. They can be recrystallized from benzene and melt at 197°–198° C.

It is sometimes advantageous in the preparation of this dihydroxy compound to start with the crude product of Example I rather than with the purified material. This crude product is boiled with water as above, the black impurity remaining mostly undissolved and being readily filtered from the hot solution.

Example III

*Chloro-6-dihydro-5,8-naphthoquinine-1,4*

This compound is readily obtained by the action of mild oxidizing agents on the product of Example II. Thus 5 parts of the white crystalline product of Example II are dissolved in 100 parts of alcohol and treated with 100 parts of a 10% solution of ferric chloride in alcohol. Black crystals (probably a quinhydrone-like material) separate at once, but on standing for about ½ hour these are replaced by bright yellow crystals. The precipitation of the crystalline material is completed by the addition of water. The crystals are then collected and recrystallized from warm dilute alcohol. The product may be further purified by crystallization from ligroin. It is thus obtained in the form of yellow crystals melting at 95°–96° C.

Example IV

*Chloro-6-naphthoquinone-1,4*

This compound is readily obtained by the more drastic oxidation of the product of Example II. Thus, 19.5 parts of the product of Example II is treated with 20 parts of chromic acid in 400 parts of glacial acetic acid. After standing overnight the reaction is complete. Dilution with water gives a bulky precipitate of yellow crystals melting at 93°–94° C., (16 parts). When crystallized from 50% alcohol this product is obtained in the form of flat, lustrous, bronze yellow needles melting at 97°–98° C.

Both the hydrogenated and unhydrogenated naphthoquinones prepared according to this invention and containing negative groups in position 6 resemble ordinary alpha naphthoquinone in being capable of forming a wide variety of compounds by addition of various substances to the —CH=CH— group occurring between the two carbonyl groups. Thus, for instance, on exposing equimolecular quantities of parathiocresol and the product of Example I to ultraviolet light, a crystalline compound is formed melting at 150° C. and having a composition $C_{17}H_{17}O_2SCl$.

The hydrogenated and unhydrogenated naphthalene derivatives containing negative substituents in position 6 formed according to the present invention also yield new and useful compounds by halogenation. Thus, chlorination of the product of Example II in dilute acetic acid solution in sunlight yields two products: The first is only slightly soluble in water and forms orange crystals melting at 187° C. It is believed to be a dichloro naphthoquinone. The second substance is soluble in water and forms red crystals melting at 155°–157° C. It is believed to be a trichlornaphthoquinone derivative having the formula $C_{10}H_7O_2Cl_3$. Solution in water acts as an indicator being red when acid and blue when alkaline. The alkaline solution dyes silk a deep blue.

B Compounds having hydrogenated ring systems

We have found that alpha, gamma-dienes having a negative substituent in the beta-position react readily with reactants of the class of alpha, beta-unsaturated carbonyl compounds. Such reactants are exemplified by alpha, beta-unsaturated acids and their esters and anhydrides such as maleic acid, maleic anhydride, ethyl maleate, fumaric acid, ethyl fumarate, acrylic acid, itaconic anhydride, and citraconic anhydride; and alpha, beta-unsaturated aldehydes and ketones such as acrolein and methyl vinyl ketone. The reaction consists in direct addition. Thus chloro-2-butadiene-1,3 and maleic acid yield the cyclic compound chloro-2-tetrahydro-1,2,3,6,-phthalic acid having the formula:

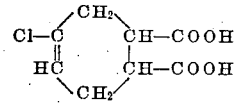

The compounds obtained by this process are new, and they are useful as intermediates for the synthesis of dyes, medicinals, perfumes, and resins.

In carrying out the process of this invention we mix a diene of the class named with a reactant as defined and cause them to react mutually. In some cases reaction proceeds spontaneously with the evolution of heat. More frequently it is necessary to heat the diene and the reactant, e. g., to 100° C. for a period of time to bring about the desired reaction. It is frequently advantageous to carry out the reaction in the presence of a solvent or a diluent, such as benzene, alcohol, or acetone, especially since the presence of the solvent usually diminishes the tendency of the diene to react with itself at the expense of the desired reaction. For the same reason it is advantageous and in some cases necessary to have present in the reaction mixture a polymerization inhibitor, and for this purpose we may use small amounts (e. g., 0.1 to 1% of the weight of the diene plus reactant) of a material such as catechol, or pyrogallol, or any of the other inhibitors listed above. The nature of this invention is further illustrated by the following examples:

Example V

*Chloro-2-butadiene-1,3 and methyl vinyl ketone. Chloro-4 (or 5) - tetrahydro - 1,2,3,6-acetophenone*

A mixture composed of 88 parts of chloro-2-butadiene-1,3, 70 parts of methyl vinyl ketone and 1 part of pyrogallol is heated by means of a water bath kept at 65°–75° C. in a vessel provided with a reflux condenser. After 17 hours the product is distilled and collected over the range. 70°–90° C. at 3 mm. To obtain the new ketone in a state of purity, this distillate is shaken with saturated sodium bisulfite solution, and the crystalline addition product after being washed with ether is decomposed by aqueous sodium carbonate and steam distilled. On redistillation it is obtained as a colorless oil boiling at about 80° C. at 2 mm. and having a density at 20° C. of 1.222. It yields a semicarbazone melting at 183°–184° C.

Example VI

*Chloro-2-butadiene-1,3 and acrolein. Chloro - 4 (or 5) -tetrahydro-1,2,3,6-benzaldehyde*

Eighty-eight parts chloro-2-butadiene-1,3 and 56 parts of acrolein are heated together in the presence of pyrogallol as in Example V. The product after purification through the bisulfite compound is a colorless liquid having an aromatic odor boiling at about 70° C. at 2 mm. and having a refractive index at 24° C. of about 1.501. It yields a semicarbazone melting at 155°–157° C. On standing the aldehyde is gradually converted into a trimeric form melting at about 197°–200° C.

Example VII

*Chloro-2-butadiene-1,3 and ethyl maleate. Diethyl chloro-4-tetrahydro-1,2,3,6-phthalate*

Twenty-nine g. of ethyl maleate and 15 g. of chloro-2-butadiene-1,3 containing 0.5% of its weight of catechol are heated in a pressure bottle for 13 hours at the temperature of boiling water. The brown liquid produced is treated with anhydrous potassium carbonate and then distilled. The new ester is obtained in 73% yield as a colorless liquid boiling at 165° C. at 4 mm. and having a density of 1.164 at 20° C. It can easily be hydrolyzed to the corresponding acid which is a crystalline solid very soluble in water and melting at 128°–129° C.

Example VIII

*Chloro-2-butadiene-1,3 and ethyl fumarate. Diethyl chloro-4-tetrahydro-1,2,3,6-phthalate*

In a manner precisely analogous to that illustrated in Example VII a similar ester (probably a stereoisomeric form) is obtained from chloro-2-butadiene-1,3 and ethyl fumarate. This ester boils at 146°–148° C. at 4 mm. and has a density of 1.164 at 20° C.

Example IX

*Chloro-2-butadiene-1,3 and maleic acid. Chloro-4-tetrahydro-1,2,3,6-phthalic acid*

One hundred sixteen parts of maleic acid and 88 parts of chloro-2-butadiene-1,3 are dissolved in acetone, and the solution is refluxed for 2 days. Evaporation of acetone yields a pasty residue. This is dissolved in dilute alkali, filtered and reprecipitated by the addition of acid. A high melting, insoluble acid, probably fumaric, separates at once. On standing, a more soluble acid melting at 166° C. separates. This is chloro-4-tetrahydro-1,2,3,6-phthalic acid identical with that obtained in Example X.

Example X

*Chloro-2-butadiene-1,3 and maleic anhydride. Chloro-4-tetrahydro-1,2,3,6-phthalic acid*

Two hundred and twelve parts of chloro-2-butadiene-1,3 and 196 parts of maleic anhydride are warmed together. The anhydride dissolves readily. Reaction sets in quickly and proceeds with sufficient vigor to keep the temperature of the reaction mixture above 50° C. for some time. After standing overnight the mixture is boiled with 2000 parts of water and the hot solution is filtered. The product then separates in the form of stout rectangular plates melting at 171–172° C. The yield is excellent.

Example XI

*Bromo-2-butadiene-1,3 and maleic anhydride. Bromo-4-tetrahydro-1,2,3,6-phthalic acid*

Ninety-eight parts of maleic anhydride is mixed with 140 parts of bromo-2-butadiene-1,3 and the mixture is allowed to stand at the ordinary temperature. After about one hour a spontaneous reaction sets in as evidenced by a gentle evolution of heat. After 3 or 4 hours the mass solidifies. The crude product is dissolved in dilute alkali and filtered. The filtrate is acidified and the precipitated acid crystallized from water. The product is thus obtained in the form of thick plates and blunt needles melting at 186.5°–187° C.

Esters of the acids prepared by the methods of Examples IX, X, and XI such as the methyl, ethyl, propyl, butyl and amyl esters can be made by refluxing the alcohol with the acid preferably in the presence of a catalyst, for example, a mineral acid such as hydrochloric acid or sulfuric acid, an aryl sulfonic acid such as paratoluene sulfonic acid, zinc chloride, or an alkali alcoholate. The esterification may be facilitated by condensing the vapors from the refluxing liquid permitting the condensate to stratify and returning the alcohol layer to the still. An addition of an indifferent carrier liquid such as benzol, toluol, or the like is a further improvement.

The above described esters are colorless oily fluids and are solvents for gums, resins, nitrocellulose, cellulose acetate, etc. They may be employed in combination with other solvents in the formation of lacquers particularly those lacquers comprising cellulose esters and are particularly valuable as high boiling point plasticizers for lacquer films, molded articles, and the like.

C. Derivatives of anthracene

We have found that valuable derivatives of anthracene can be obtained by reacting a beta-negatively substituted 1,3-diene with alpha-naphthoquinone or a homolog or derivative of alpha-naphthoquinone. The nature of this reaction is illustrated by the following equation:

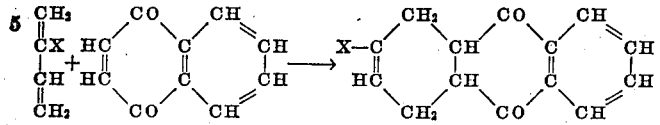

in which X represent a negative substituent such as a halogen or phenyl. Similarly, hydrogenated anthraquinone derivatives which are negatively substituted in the beta positions of both of the terminal rings, e. g.,

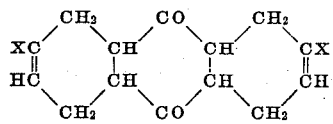

may be prepared by the reaction of two molecular equivalents of a beta negatively substituted 1,3 diene with one molecular equivalent of para benzoquinone, tetrahydro-1,4,4a,8a-anthraquinone with a negative substituent in position 6 being formed as an intermediate product. Both the 2,6 and the 2,7-disubstituted derivatives are usually formed by this reaction, and may be separated by fractional crystallization.

The hydrogenated derivatives of anthraquinone thus obtained are crystalline solids. When suspended in aqueous, or alcoholic alkali and exposed to the action of air they are rapidly converted into the corresponding unreduced anthraquinones. The method of the present invention thus provides a means of preparing a great variety of beta-substituted anthraquinones. The nature of this invention is further illustrated by the following examples.

EXAMPLE XII

*Chloro-2-butadiene-1,3 and alpha naphthoquinone. Chloro - 2 - tetrahydro-1,4,4a,9a-anthraquinone-9,10 and chloro-2-anthraquinone*

Sixteen parts of alpha-naphthoquinone and 9 parts of chlorobutadiene are mixed with 50 parts of benzene and the mixture is allowed to stand for some time and is then gently refluxed for 2 hours. The benzene is then removed by distillation and the residue is dissolved in warm alcohol. This solution on being cooled deposits a certain amount of unchanged naphthoquinone. This is removed and the new anthracene derivative is obtained by evaporation of the alcohol or precipitation by water. It can be purified further by recrystallization from alcohol. It melts at about 76° C.

This compound is readily transformed into chloro-2-anthraquinone by suspending it in an excess of dilute alcoholic potassium or sodium hydroxide and bubbling air through the mixture. The mixture first becomes deep red in color and the reaction is complete practically as soon as the red color has disappeared. The beta-chloroanthraquinone can then be filtered off and crystallized from amyl alcohol.

EXAMPLE XIII

*Bromo-2-butadiene-1,3 and alpha naphthoquinone. Bromo - 2 - tetrahydro-1,4,4a,9a-anthraquinone and bromo-2-anthraquinone*

Bromo-2-butadiene-1,3 and alpha-naphthoquinone are caused to react as in Example XII. The hydrogenated anthracene derivative in this case is a crystalline solid which melts, when rapidly heated, at 138° C. It is oxidized by air in the presence of alkali to beta-bromoanthraquinone.

EXAMPLE XIV

*Phenyl-2-butadiene-1,3 and alpha naphthoquinone. Phenyl - 2 - tetrahydro-1,4,4a,9a-anthraquinone and phenyl-2-anthraquinone*

Twenty-five parts each of beta-phenylbutadiene and alpha naphthoquinone are heated at 90°–100° C. The mixture soon becomes homogeneous and then after about 20 minutes it solidifies almost completely. The solid mass is washed with cold methanol and then crystallized from acetone. It is thus obtained in the form of small white crystals melting at 146°–147° C. The yield is quantitative.

One part of this substance is suspended in 40 parts of ethyl alcohol containing 2 parts of a 50% aqueous solution of sodium hydroxide. Air is bubbled through this suspension. After about 20 minutes the red color disappears. The suspended solid is then filtered off. It is phenyl-2-anthraquinone.

EXAMPLE XV

*Chloro - 2 - tetramethylene - 3,4 - butadiene-1,3 and alpha naphthoquinone. Chloro-2-tetramethylene - 3,4 - tetrahydro - 1,4,4a,9a - anthraquinone and chloro-2-tetramethylene-3,4-anthraquinone*

Chloro - 2 - tetramethylene - 3,4 - butadiene-1,3 prepared as described in the Carothers and Coffman application is mixed with one-half its weight of naphthoquinone and the mixture is heated at 100° C. during 20 minutes. On cooling the reaction mixture sets to a crystalline magma. This is washed with methanol and recrystallized from ethyl alcohol. The product having the formula:

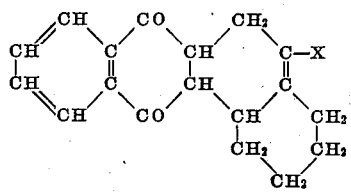

is obtained in the form of white crystals melting at 191°–192°C.

EXAMPLE XVI

*Chloro - 2 - methyl - 3 - butadiene-1,3 and alpha naphthoquinone. Chloro-2-methyl-3-tetrahydro - 1,4,4a,9a - anthraquinone and chloro - 2 - methyl-3-anthraquinone*

Chloro-2-methyl-3-butadiene-1,3 prepared by the method described in the Carothers and Coffman application, above cited, is mixed with one-half its weight of naphthoquinone. The mixture is heated at 100° C. for one-half hour, and the crystalline product is washed with methanol and recrystallized from aqueous acetone. It melts at 165°–166° C. This product is readily oxidized to methyl-2-chloro-3-anthraquinone by the action of air in the presence of alcoholic aqueous alkali.

EXAMPLE XVII

*Methyl - 1 - chloro - 2 - butadiene - 1,3 and naphthoquinone. Methyl - 1-chloro-2-tetrahydro-1,4,4a,9a-anthraquinone and methyl-1-chloro-2-anthraquinone*

Methyl-1-chloro-2-butadiene-1,3 obtained by the method described in the Jacobson application, above cited, combines readily with naphthoquinone under the conditions described in the preceding examples. The new tetrahydroanthraquinone is a white solid readily oxidized by air in the presence of alkali to the new anthraquinone. The latter is a yellow crystalline solid melting at 181° C.

EXAMPLE XVIII

*Alkyl - 1 - chloro - 2 - butadiene - 1,3 and alpha naphthoquinone*

By the method described in Example XVII other alkyl-1-chloro-2-butadienes such as have been described by Jacobson can be combined with naphthoquinone to form tetrahydroanthraquinones which are readily oxidized to the corresponding unreduced anthraquinones. Thus ethyl-1-chloro-2-butadiene-1,3 gives ethyl-1-chloro-2-anthraquinone, a yellow crystalline solid melting at 151°–152° C.; butyl-1-chloro-2-butadiene-1,3 gives butyl-1-chloro-2-anthraquinone, a yellow crystalline solid melting at 129°–130° C.; heptyl-1-chloro-2-butadiene-1,3 gives heptyl-1-chloro-2-anthraquinone, a yellow crystalline solid melting at 112.5–113.5° C. The intermediate tetrahydroanthraquinones are white crystalline solids.

EXAMPLE XIX

*Dimethyl - 1,2 - chloro - 3 - butadiene - 1,3 and alpha naphthoquinone. Dimethyl-1,2-chloro-3-tetrahydro-1,4,4a,9a-anthraquinone and dimethyl-1,2-chloro-3-anthraquinone*

Dimethyl-1,2-chloro-3-butadiene-1,3 prepared by the method of Carothers and Coffman combines readily with naphthoquinone under the conditions illustrated in previous examples. The hydroanthraquinone derivative thus obtained is a white crystalline solid melting at 107° C. It is readily oxidized by air in the presence of alkali to the new anthraquinone, a yellow crystalline solid melting at 171.5° C.

EXAMPLE XX

*Chloro-2-butadiene-1,3 and para benzoquinone. Dichloro - 2,6- and dichloro-2,7 octahydro-1,4,4a,5,8,8a,9a,10a-anthraquinone*

Fifty grams of chloro-2-butadiene-1,3 and 15 grams of benzoquinone are boiled under a reflux condenser for 24 hours. A semi-solid crystalline mass results, from which unchanged chloro-2-butadiene-1,3 and its polymers are removed by suction. After digestion with warm alcohol to remove any chloro - 6 - tetrahydro - 4a,5,8,8a-naphthoquinone which is formed as an intermediate product and which may not have reacted completely with the chloro-2-butadiene-1,3, the crystalline residue is recrystallized from ethyl acetate, yielding colorless needles of dichloro-2,6-compound, melting at 220°–222° C. Evaporation of the mother liquor gives the crude 2,7 isomer which, when recrystallized from benzene forms fine needles melting at 145–148° C. On further heating it solidifies and melts again at 190° C., having been converted into a more stable modification. The same change is brought about by boiling with alcohol and then allowing to crystallize. In this case, slender white needles melting at 218°–220° C. are obtained. Similar results may be obtained by starting with equimolecular quantities of chloro-2-butadiene-1,3 and chloro-6-tetrahydro - 1,4,4a,8a - naphthoquinone prepared as above. Oxidation of the 2,6 isomer (m. p. 220°–222° C.) with pure or atmospheric oxygen while suspended in warm alcoholic sodium or potassium hydroxide gives dichloro-2,6-anthraquinone. The crude product filtered from the alcoholic solution and recrystallized from xylene forms yellow needles which melt at 284–286° C. Oxidation by the same method of either of the 2,7 isomers (melting 145°–148° C. and 218°–220° C.) gives dichloro-2,7-anthraquinone, which, on recrystallization from ethyl acetate, forms pale yellow crystals melting at about 223° C.

When the preparation of the chloro anthraquinones is the primary object, it is advantageous to oxidize the mixture of dichloro octahydroanthraquinones (from which by-products have been removed by extraction with alcohol) with air as described above, without separation. The resulting mixture of dichloro-2,6- and 2,7-anthraquinones may then be readily separated as follows: Crystallization from xylene gives practically pure 2,6 isomer, the 2,7 isomer remaining dissolved. The latter may then be recovered by evaporation of the xylene, followed by recrystallization from ethyl acetate, if desired. Instead of oxidizing with air in alkaline solution, other oxidizing conditions may be used, such as treatment in glacial acetic acid solution with chromic acid.

If the above reaction between chloro-2-butadiene-1,3 and benzoquinone is run for 72 hours and the product, after washing with hot ethyl alcohol is recrystallized from xylene, there is formed a new octahydro dichloro 2,6-anthraquinone isomeric with that described above. It forms nearly colorless platelets melting 262°–264° C., which are oxidized to dichloro-2,6-anthraquinone by the usual method.

EXAMPLE XXI

*Chloro-2-butadiene-1,3 and chloro-6-dihydro-5,8 naphthoquinone-1,4. Dichloro-2,6- and dichloro - 2,7 - hexanhydro-1,4,4a,5,8,9a-anthraquinones*

Ten grams of chloro-2-butadiene-1,3 and 10 grams of the above naphthoquinone are boiled for 16 hours under a reflux condenser. A solid, crystalline mass results, containing the 2,6 and 2,7 isomers of the dichloro-hexahydroanthraquinone and a deep purple substance probably a quinhydrone. The purple substance is partly separated by boiling the crude product with ethyl acetate, in which it is only slightly soluble. Concentration of this solution gives first the 2,6 isomer, then the more soluble 2,7 isomer, which are further purified by recrystallization from benzene or xylene. The 2,6 isomer forms slightly orange needles melting 254°–256° C. and the 2,7 isomer while needles melting 246°–247° C. They may be oxidized by the method used in Example IX to dichloro-2,6- and 2,7-anthraquinones, respectively. The purple compound above may be purified by recrystallization from glacial acetic acid and melts at 250°–255° C.

Example XXII

*Chloro-2-butadiene-1,3 and chloro-6-naphthoquinone-1,4. Dichloro-2,6- and dichloro-2,7-tetrahydro-1,4,4a,9a-anthraquinones.*

Fifty grams of chloro-2-butadiene-1,3 and 56 grams of chloro-6-naphthoquinone-1,4 are boiled for 18 hours under a reflux condenser. A solid, crystalline mass results, containing the 2,6 and 2,7 isomers and a deep blue substance, probably a quinhydrone. These are separated as follows:

Unchanged chloro-2-butadiene-1,3 and its polymers are extracted with ethyl acetate. The insoluble material is then boiled with xylene, in which the blue material is only slightly soluble. The material separating from the xylene solution on cooling and concentrating is then boiled with ethyl acetate, in which the 2,6 isomer is insoluble. Recrystallized from xylene, the 2,6 isomer forms fine white needles melting 194°–196° C. The 2,7 isomer, obtained by evaporation of the ethyl acetate solution is purified by recrystallization from benzene (in which a residual portion of the blue substance is insoluble) and finally from high boiling ligroin. It forms white needles melting 174°–175° C. The two isomers may be oxidized by the method used in Example XX, to the dichloro-2,6- and 2,7-anthraquinones. The deep blue compound above may be purified by recrystallization from xylene and melts at 277°–278° C.

The hexahydro- and tetrahydro-anthraquinones prepared according to the teachings of this invention may under certain conditions be isomerized to form the corresponding dihydroxy-9,10-anthracenes. Thus dichloro-2,6-tetrahydro-1,4,4a,9a-anthraquinone prepared in Example XI, when boiled with acid, for instance dilute alcoholic hydrochloric acid, is readily converted into dichloro-2,6-dihydro-1,4-dihydroxy-9,10-anthracene, which separates as white crystals (m. p. 264°–267° C.) on cooling. It oxidized rapidly in air to a blue quinhydrone-like substance, melting at 273°–274° C. Similarly the dichloro - 2,7 - tetrahydro - 1,4,4a,9a-anthraquinone is readily converted by the same method to dichloro-2,7 - dihydro - 1,4 - dihydroxy - 9,10-anthracene melting at 245°–250° C.

Isomerization to the enolic form may also be brought about by heating with acetic anhydride, preferably at about 140° C. The diacetate is the final product in this case. Thus, dichloro-2,6-hexahydro - 1,4,4a,5,8,9a - anthraquinone heated with acetic anhydride gives the diacetate of dichloro - 2,6 - tetrahydro - 1,4,5,8 - dihydroxy-9,10-anthracene (slender needles from xylene, m. p. 290°–293° C.). Similarly, dichloro-2,6-tetrahydro-1,4,4a,9a - anthraquinone gives the diacetate of dichloro-2,6-dihydro-1,4-dihydroxy-9,10-anthracene (needles from benzene, m. p. 264°–267° C.).

The partly hydrogenated dihydroxy anthracenes mentioned above may be oxidized for example by chromic acid by atmospheric oxygen in alkaline solution to the corresponding unhydrogenated anthraquinones. On the other hand, milder oxidizing agents such as ferric chloride or simply heating the compound in the presence of air causes a partial dehydrogenation with the formation of new, less highly hydrogenated anthraquinones. Thus, dichloro - 2,6-dihydro-1,4-dihydroxy-9,10-anthracene, whose preparation is described above, gives, on treatment with alcoholic ferric chloride, yellow crystals of dichloro-2,6-dihydro-1,4-anthraquinones (m. p. 293° C.).

Similarly, dichloro - 2,7-dihydro-1,4-dihydroxy-9,10-anthracene above, when boiled in benzene solution in the presence of air gives first a deep blue quinhydrone (M. P. 230° C.) which on longer boiling is converted into pink crystals of dichloro-2,7-dihydro-1,4-anthraquinone (m. p. 196° C.).

The anthraquinone derivatives prepared according to this invention, as well as the naphthalene derivatives discussed above, yield new and valuable products on halogenation. Thus, the mixture of dichloro-2,6- and 2,7-octahydro anthraquinones prepared according to Example IX when chlorinated in carbon tetrachloride solution in sunlight in the presence of iron filings, yields a mixture of chlorinated products. On oxidation of this mixture by air in alcoholic sodium hydroxide solution by the general method already described, there is formed among other products, a trichloro anthraquinone in the form of yellow needles melting at 222° C.

The method used for numbering the carbon atoms in the naphthalene and anthracene ring systems is illustrated as follows:

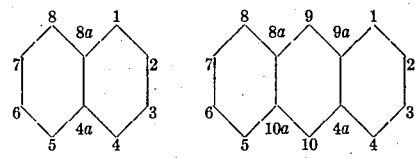

The above description and specific examples are to be taken as illustrative only, and not as limiting the scope of the invention. Any modification or variation therefrom which conforms to the spirit of the invention are included within the scope of the claims.

We claim:

1. The process of forming cyclic compounds which comprises reacting an alpha, gamma-diene containing a single negative substituent which is in the beta position, said substituent being a member of the class consisting of halogen and phenyl radicals, with a compound containing an active carbon-carbon double bond, said compound being taken from the class consisting of alpha, beta-unsaturated carboxylic acids, their esters and anhydrides; alpha, beta-unsaturated aldehydes and ketones; and quinones.

2. The process of claim 1 in which the beta-negative substituent of the diene is a halogen atom.

3. The process of claim 1 in which the beta-negative substituent of the diene is a chlorine atom.

4. The process of forming cyclic compounds which comprises reacting an alpha, gamma-diene containing a single negative substituent which is in the beta position with a compound containing the nucleus C=C—C=O, said substituent being a member of the class consisting of halogen and phenyl radicals.

5. The process of claim 4 in which the beta-negative substituent of the diene is a chlorine atom.

6. The process of forming cyclic compounds which comprises reacting an alpha, gamma-diene containing a single negative substituent which is in the beta position with a compound containing the nucleus C=C—C=O, in which the carbon atom of the carbon-carbon double bond is non-aromatic, said substituent being a member of the class consisting of halogen and phenyl radicals.

7. The process of claim 6 in which the alpha gamma-diene is aliphatic.

8. A chemical compound containing a cyclohexene ring carrying a negative substituent on one of the doubly bonded carbon atoms, said substituent being a member of the class consisting of halogen and phenyl radicals.

9. The compound described in claim 8 in which the said negative substituent is a halogen atom.

10. The compound described in claim 8 in which the said negative substituent is a chlorine atom.

11. The process of forming cyclic compounds which comprises reacting an alpha, gamma-diene containing a single negative substituent which is in the beta position with a quinone, said substituent being a member of the class consisting of halogen and phenyl radicals.

12. The process of claim 11 in which the quinone is a benzoquinone.

13. The process of claim 11 in which the quinone is a p-benzoquinone.

14. The process of claim 11 further characterized in that the reaction product is subjected to a dehydrogenation treatment.

15. The process of claim 11 further characterized in that the reaction product is subjected to progressive dehydrogenation.

16. A chemical compound comprising a derivative of naphthalene prepared by reacting an alpha, gamma-diene substituted in the beta-position by a negative substituent, with a quinone, said substituent being a member of the class consisting of halogen and phenyl radicals.

17. The compound of claim 16 characterized in that the negative substituent is a halogen atom.

18. The compound of claim 16 characterized in that the negative is a chlorine atom.

19. A hydronaphthoquinone having a negative substituent in position 6, said substituent being a member of the class consisting of halogen and phenyl radicals.

20. The compound described in claim 19 in which the negative substituent is a halogen atom.

21. A tetrahydro - $4a,5,8,8a$-naphthoquinone-1,4 having a negative substituent in position 6, said substituent being a member of the class consisting of halogen and phenyl radicals.

22. A dihydroxy - 1,4-dihydro-5,8-naphthalene having a negative substituent in position 6, said substituent being a member of the class consisting of halogen and phenyl radicals.

23. A dihydro-5,8-naphthoquinone-1,4 having a negative substituent in position 6, said substituent being a member of the class consisting of halogen and phenyl radicals.

24. A hydrophthalic acid containing a halogen atom in the 5-position.

25. A halogen-5-tetrahydro-phthalic acid.

26. A process which comprises reacting an alpha, gamma-diene having a negative substituent in the beta-position with a naphthoquinone, said substituent being a member of the class consisting of halogen and phenyl radicals.

27. The process of claim 26 in which the said negative substituent is a halogen atom.

28. The process of claim 26 in which the said negative substituent is a chlorine atom.

29. A process which comprises reacting an alpha, gamma-diene having a negative substituent in the beta-position with an alpha-naphthoquinone, said substituent being a member of the class consisting of halogen and phenyl radicals.

30. A process which comprises reacting an alpha, gamma-diene having a negative substituent in the beta-position with a naphthoquinone, then oxidizing the reaction product, said substituent being a member of the class consisting of halogen and phenyl radicals.

31. The process of claim 30 in which the said negative substituent is a halogen atom.

32. The process of claim 30 in which the said negative substituent is a chlorine atom.

33. A tetrahydro-anthraquinone having a negative substituent in position 2, said substituent being a member of the class consisting of halogen and phenyl radicals.

34. A halogen-2-tetrahydro-anthraquinone.

35. A chloro-2-tetrahydro-anthraquinone.

36. A process for the preparation of a composition of matter which comprises reacting two molecular equivalents of an alpha, gamma-diene having a single negative substituent which is in the beta position with one molecular equivalent of parabenzoquinone or of a derivative thereof, said substituent being a member of the class consisting of halogen and phenyl radicals.

37. A process for preparing derivatives of anthraquinone which consists in oxidizing the reaction product of claim 36.

38. The process of claim 36 in which the diene is a halogen-2-butadiene-1,3.

39. The process of claim 36 in which the diene is chloro-2-butadiene-1,3.

WALLACE H. CAROTHERS.
ARNOLD M. COLLINS.